(12) United States Patent
Palisoc et al.

(10) Patent No.: US 12,088,007 B2
(45) Date of Patent: Sep. 10, 2024

(54) METHODS OF MAKING COMPACTABLE RF MEMBRANE ANTENNA

(71) Applicant: L'Garde, Inc., Tustin, CA (US)

(72) Inventors: Arthur Libornio Palisoc, Irvine, CA (US); Linden Bolisay, Fountain Valley, CA (US)

(73) Assignee: L'Garde, Inc., Tustin, CA (US)

( * ) Notice: Subject to any disclaimer, the term of this patent is extended or adjusted under 35 U.S.C. 154(b) by 682 days.

(21) Appl. No.: 17/168,715

(22) Filed: Feb. 5, 2021

(65) Prior Publication Data

US 2021/0159604 A1 May 27, 2021

Related U.S. Application Data

(63) Continuation of application No. PCT/US2019/045036, filed on Aug. 4, 2019.

(60) Provisional application No. 62/714,939, filed on Aug. 6, 2018.

(51) Int. Cl.
| | | |
|---|---|---|
| *H01Q 15/14* | (2006.01) | |
| *B29C 70/30* | (2006.01) | |
| *B29C 70/54* | (2006.01) | |
| *B29K 307/04* | (2006.01) | |
| *B29L 31/34* | (2006.01) | |
| *H01Q 15/16* | (2006.01) | |

(52) U.S. Cl.
CPC .......... *H01Q 15/141* (2013.01); *B29C 70/30* (2013.01); *B29C 70/545* (2013.01); *H01Q 15/163* (2013.01); *B29K 2307/04* (2013.01); *B29L 2031/3456* (2013.01)

(58) Field of Classification Search
CPC .... H01Q 15/141; H01Q 15/163; B29C 70/30; B29C 70/545; B29K 2307/04; B29L 2031/3456

See application file for complete search history.

(56) References Cited

U.S. PATENT DOCUMENTS

| | | | |
|---|---|---|---|
| 3,521,290 A | | 7/1970 | Bahiman et al. |
| 3,780,375 A | | 12/1973 | Cummings et al. |
| 4,092,453 A | * | 5/1978 | Jonda .................. H01Q 15/168 |
| | | | 343/912 |
| 4,647,329 A | * | 3/1987 | Oono .................. H01Q 15/142 |
| | | | 343/912 |
| 4,820,170 A | | 4/1989 | Redmond et al. |
| 5,451,975 A | * | 9/1995 | Miller ................. H01Q 15/162 |
| | | | 343/915 |

(Continued)

FOREIGN PATENT DOCUMENTS

| | | | |
|---|---|---|---|
| CN | 104393421 A | * | 3/2015 |
| CN | 204216229 U | * | 3/2015 |

(Continued)

*Primary Examiner* — Jeffrey T Carley
*Assistant Examiner* — Jose K Abraham
(74) *Attorney, Agent, or Firm* — Kari L. Barnes (57) ABSTRACT

Exemplary embodiments are described herein for compactable antennas and methods of making such an antenna. Exemplary compactable antennas include a support structure and a reflector surface. The support structure may directly or indirectly define the reflector shape. Exemplary embodiments comprise deployable support structures to permit the compactable antenna to have a smaller volume stowed configuration and a larger volume deployed configuration.

20 Claims, 9 Drawing Sheets

(56) References Cited

U.S. PATENT DOCUMENTS

| | | | |
|---|---|---|---|
| 9,810,820 B1 * | 11/2017 | Starkovich | B29C 65/48 |
| 2003/0132543 A1 | 7/2003 | Gardner | |
| 2005/0104798 A1 | 5/2005 | Nolan et al. | |
| 2009/0001219 A1 | 1/2009 | Golecki et al. | |
| 2013/0207881 A1 | 8/2013 | Fujii et al. | |
| 2016/0288453 A1 | 10/2016 | Mejia-Ariza | |
| 2016/0361910 A1 * | 12/2016 | Franck, III | B29C 66/7375 |

FOREIGN PATENT DOCUMENTS

| | | | | |
|---|---|---|---|---|
| JP | 60125003 | | 7/1985 | |
| JP | 2004221897 A | * | 8/2004 | H01Q 1/288 |
| JP | 2018104250 A | * | 7/2018 | |
| WO | 2017151689 A1 | | 9/2017 | |

* cited by examiner

METHODS OF MAKING COMPACTABLE RF MEMBRANE ANTENNA

CROSS-REFERENCES TO RELATED APPLICATIONS

This application claims priority as a continuation to International Application Number PCT/US2019/045036, filed Aug. 4, 2019, which claims benefit of U.S. Provisional Application No. 62/714,939, filed Aug. 6, 2018, which are incorporated by reference in their entirety.

BACKGROUND

Large dish antennas have played a substantial role in astronomy, collecting radio-frequency (RF) waves from nearby planets and stars, as well as intergalactic waves from the far reaches of the universe. Their contribution has consisted of data that explain mysteries of the birth of the universe from the earliest moments of the big bang. More recently, they are aiding in the discovery and characterization of exoplanets orbiting stars in our own galaxy.

Concurrently, advances in miniaturizing technology have allowed spacecraft to shrink in size and weight while maintaining capabilities rivaling that of much larger traditional satellites and crafts. However, the sensitivity and resolution of radar antenna detection depends directly on the area of the antenna receiver or dish. So, while other spacecraft components such as high-speed processors, high energy density batteries, solar cells, inertial measurement units, divert and attitude control systems, etc. have shrunk in size and weight in today's smallsats and nanosats, the antenna area must remain large to provide the required performance.

This demand for large area has resulted in new concept designs for RF antennas that maintain large area while allowing for highly compactable storage during launch into space. The antenna must be able to be folded into a small volume in a rocket payload, and, once in space, deploy to its full extent while maintaining an accurate parabolic reflective surface quality and shape that permits the collection of undistorted radio wave information from light years away.

Conventional stowable antennas include pre-formed rigid structures that include discrete positions that permit the segments to fold into a collapsed configuration. By extending the structure by unfolding and locking these joints, the structures defines a desired deployed configuration. For example, rigid sheets may include hinges between sheets to permit the antenna to unfold from a stowed configuration to a deployed configuration. Similarly, a support frame of an antenna structure may include rigid segmented rods that form foldable links. The support frame may be folded at discrete positions in the stowed configuration and unfolded and locked in a deployed configuration.

Conventional stowable antennas that do not include static, pre-formed shapes may include inflatable structures. These structures are essentially balloons in the shape of the desired final form. These systems, however, require additional components for storing and applying the inflation gas or substance to deploy the structure. Therefore, these structures may provide a benefit in not requiring a specific or static stored configuration mandated by preformed and static structures. However, these structure require additional space and weight be dedicated to deployment of the structure.

SUMMARY

Exemplary embodiments are described herein for compactable antennas and methods of making these antennas. Exemplary compactable antennas include a support structure and a reflector surface. The support structure may directly or indirectly define the reflector shape.

Exemplary embodiments comprise deployable support structures to permit the compactable antenna to have a smaller volume stowed configuration and a larger volume deployed configuration.

DRAWINGS

The drawings and following associated descriptions are provided to illustrate embodiments of the present disclosure and do not limit the scope of the claims. Corresponding numerals indicate corresponding parts.

DESCRIPTION OF EXEMPLARY EMBODIMENTS

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments. In addition, embodiments of the inventions can comprise several novel features and no single feature is solely responsible for its desirable attributes or is essential to practicing the inventions herein described.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. Features may also be integrated or subdivided as necessary, such that the any combination of features, whether integrated, separated, removed, added, duplicated, or otherwise recombined fall within the scope of the instant disclosure.

Exemplary embodiments described may incorporate a shape memory composite defining a support framework, defining a support structure, or integrated into all or a portion of a non-structured collapsible antenna. Although embodiments described herein are in terms of a shape memory composite, exemplary antenna configurations may be novel by themselves. Therefore, the described structure may be made using any conventional deployable antenna material. Exemplary embodiments include two inventive designs for compactable RF antennas comprised of membrane reflectors. These designs are exemplary only and features may be recombined between them as necessary to achieve a given function. Although described in terms of radio frequency (RF) reflectors, exemplary embodiments may be used in other applications, such as reflectors for light or for transmitting/receiving other signals. Exemplary embodiments of the deployable structure may be used in other applications as well.

Figure 1:
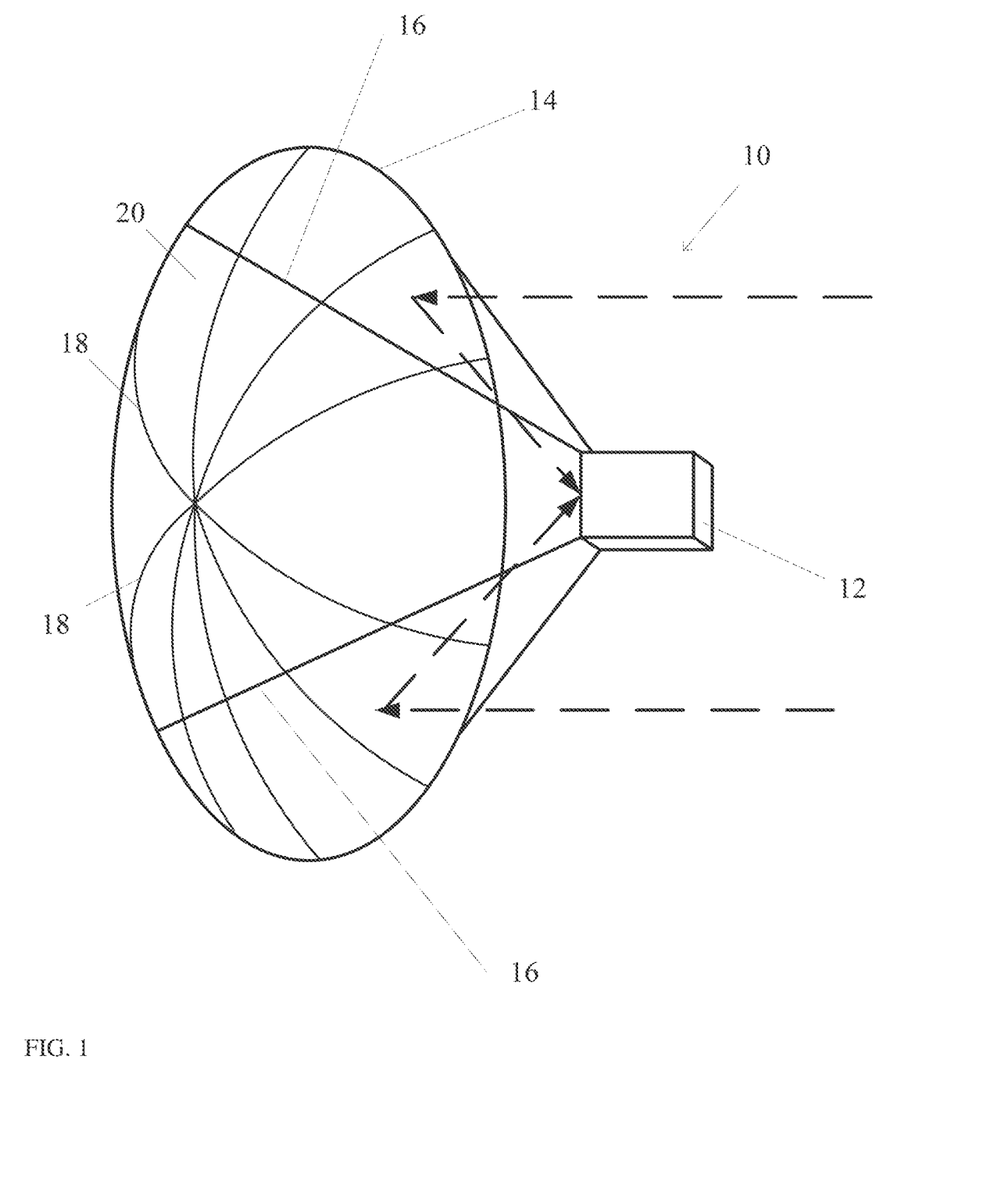
FIG. 1, FIG. 2, and FIGS. 3A-3B illustrate exemplary symmetric antenna configurations.
Figure 2:
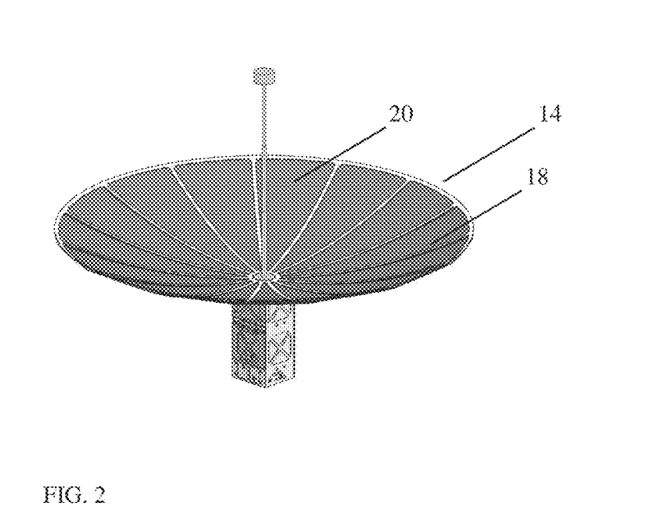
Figures 3A, 3B:
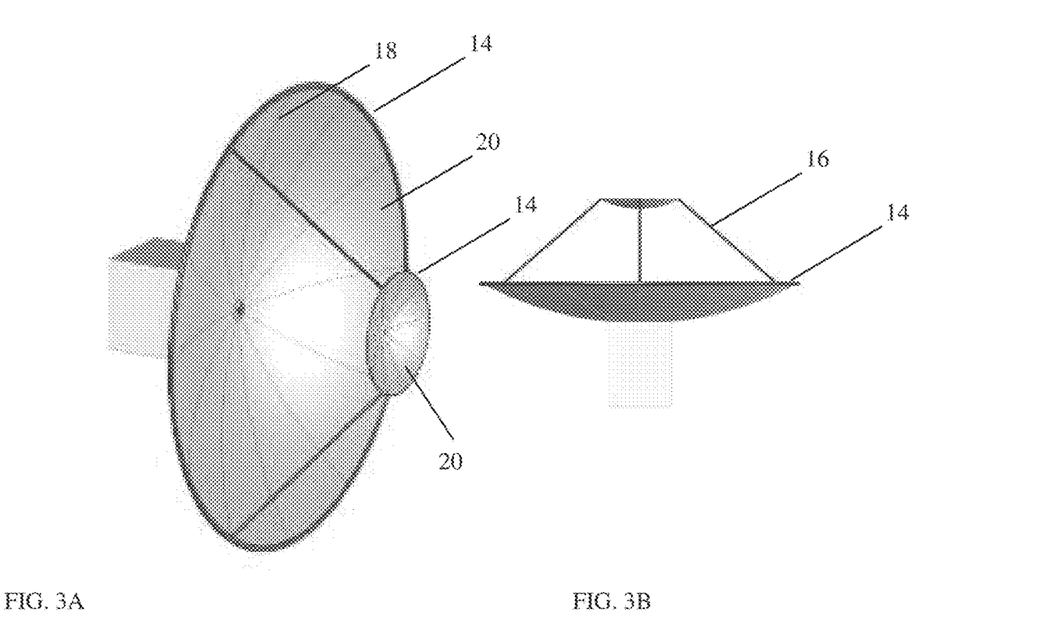
Figure 4:
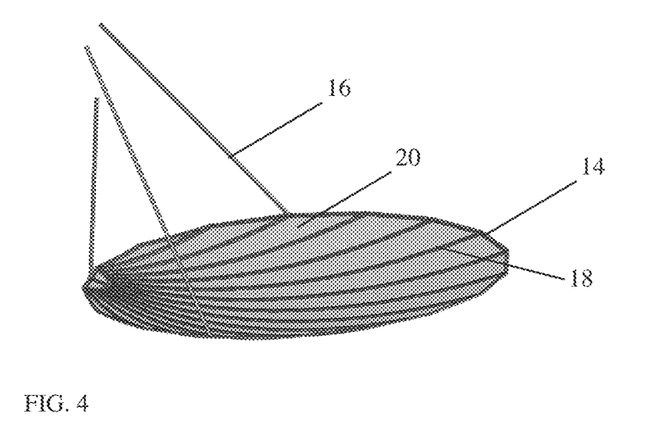
FIG. 4 illustrates an exemplary asymmetric reflector.

FIG. 1 illustrates an exemplary compactable membrane antenna. The antenna 10 includes a reflector 20 configured to receive an RF signal (dashed line) and direct the signal or wave to a collector 12. The shape of the reflector 20 is important to position the reflective surface in a proper location relative to the collector such that the received signal can be properly positioned at the collector. As shown in FIG. 1, a single reflector is used with a collector. However, any combination of reflectors may be used. For example, FIG. 2 illustrates a similar reflector, but the collector is an extended configuration in which a portion of the collector is positioned behind the reflector and a receiving portion is positioned in front of the reflector. Other dual reflector configurations, such as that illustrated in FIGS. 3A-3B may also be used. In this case, a primary reflector is similar to that of FIG. 1, and a secondary reflector is positioned at the receiving location of the primary reflector. The secondary reflector is then configured to direct the received RF signals from the primary reflector to the collector. The collector may be positioned behind the primary reflector with a passage or hole in the primary reflector to permit the RF signal to pass from the secondary collector to the collector. Other reflector configurations may also be used, such as that of FIG. 4 in which the reflector includes an asymmetric configuration. This case may be used when the collector is positioned off axis from the reflector. As shown in FIG. 4, the ribs 18 may extend across substantially an entire chord length from one side of the reflector to the other. As illustrated any configuration of one or more reflectors and collector may be used according to embodiments described herein. The illustrated reflector configurations are exemplary only and not intended to be limiting.

Exemplary reflectors include a support structure such as outer frame 14, ribs 18, and combinations thereof. The support structure supports the reflector 20. The reflector and/or support structure may be coupled to an object, such as the collector or other reflector, by struts 16.

In an exemplary embodiment, the support structure comprises an outer frame 14. The support structure may include any enclosed shapes such as elliptical, circular, polygon, clam shell, etc. The support structure may comprise a curved structure or discrete linear sections angled with respect to adjacent linear sections to approximate a curved surface. Exemplary embodiments include a torus outer frame.

In an exemplary embodiment, the support structure comprises ribs 18. Any number of ribs may traverse the enclosed space within the perimeter of the outer frame. Ribs 18 provide support for the reflective surface of reflector 20. Ribs 18 may be used to define the shape of the reflective surface of reflector 20. Ribs may define a symmetric or asymmetric configuration. As shown in FIGS. 1-3, ribs may attach at one terminal end to the outer frame and extend toward each other to directly or indirectly attach to each other at an opposite terminal end. The ribs may approach a central axis of the outer frame 14 to define a symmetric support structure. The ribs may be curved to define a desired reflective surface of the antenna. As seen in FIG. 3B, the ribs may extend out of the plane of the outer frame 14.

Figure 5:
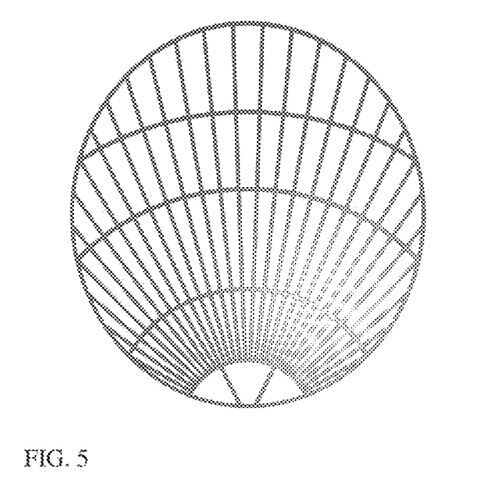
FIG. 5 illustrates an exemplary support structure for a reflector.

The ribs that define the reflector shape, such as an approximate parabolic shape, may be made with a cross section that increases its area moment of inertia for added stiffness such as an I-beam or a T-beam. The stiffness may also or alternatively be increased by the inclusion of cross-ribs coupled between adjacent ribs. FIG. 5 illustrates an exemplary embodiment having cross-ribs for the offset geometry. However, such configuration may also be used for any known or disclosed embodiment.

In an exemplary embodiment, struts 16 may be used to couple component parts. For example, struts may extend between reflectors, between reflectors and collectors, or between any combination thereof or other component. Struts may couple directly or indirectly to the support structure.

In an exemplary embodiment, the support structure, including outer frame 14 and/or ribs 18, and/or struts 16 may comprise a shape memory composite material. The shape memory composite material permits the antenna to collapse under imposition of an outside force in a non-structured fashion. The collapsed configuration may therefore be dynamically determined based on the storage compartment or the outside force applied. For example, the shape memory composite may be flexible or deformable along a length when a force is applied. The shape memory composite, however, returns to a remembered configuration, once the force is removed. Therefore, exemplary embodiments may include a stored configuration in which the support structure is retained in the stored configuration having a reduced storage volume through application of an outside force; and a deployed configuration in which the support structure is fully deployed having a larger storage volume when the outside force is removed. In other words, the remembered or biased configuration may be a deployed configuration in which the support structure is configured for use as an RF reflector. In an exemplary embodiment, the shape memory composite may flex in any direction under application of an outside force. In an exemplary embodiment, the shape memory composite may flex at multiple locations along a length of the member or along an entire length of the member. In an exemplary embodiment, the shape memory composite may return to a remembered configuration, such as linear, circular, ovoid, curved, parabolic, or other predefined shape when the outside force is removed.

An exemplary shape memory composite material includes a base material of one or more of carbon fabric or tows, Vectran, or Kevlar. The base material comprises strands. The strands may be generally aligned along a length of the structure, may include one or more aligned arrangements, may be wound or helically positioned, may be woven, or any combination thereof. The shape memory composite material includes a matrix around and/or between the base material. The matrix may be silicone, urethane, or epoxy. Exemplary shape memory composite materials are described in co-owned patent application U.S. Patent Publication Number 2016/0288453, titled "Composite Material".

In an exemplary embodiment, the shape memory composite material the volume fraction ratio of fabric-to-resin is controlled to achieve a desired shape memory retention even after long-term stowage in a folded/packaged state. An exemplary fiber-to-resin volume fraction ratio is from 52 to 65, namely 52 percent to 65 percent fiber or 48 percent to 35 percent matrix or resin. The average fiber-to-matrix ratio is about 58 percent. The fibers may be carbon, Kevlar, Vectran, nylon, or otherwise described herein and the resin may be urethane, silicone or epoxy or otherwise described herein as the matrix.

In an exemplary embodiment, the reflector may include a flexible membrane having a highly reflective surface. The surface may be created by coating, laminating, depositing, or otherwise attaching a material to the membrane surface or from the membrane surface itself. In an exemplary embodiment, the membrane comprises mylar, kapton, polyurethane-coated nylon (PCN), tedlar, Teflon, other polyimide or plastic materials, and combinations thereof. The reflective coating may include a layer of high conductivity metal, such as aluminum, silver, silver-inconel, and combinations thereof. The membrane may also be made of a conductive material such as foils of aluminum or stainless steel as well as carbon fabric or a conductive mesh. The membrane may also consist of a laminate of a combination of some or all of the above materials. The surface may be coated with a layer of high conductivity metal such as aluminum or silver or silver-inconel. The thickness of the metallization can be between 100 to 2,000 Angstroms.

In an exemplary embodiment, the reflector may include a monolithic surface made of a shape memory composite material laminated with a layer or layers of metallized membrane such as mylar, kapton, polyurethane-coated nylon (PCN), tedlar, Teflon or other polyimide or plastic material. The shape memory composite may be coated with a layer of high conductivity metal such as aluminum or silver or silver-inconel, as described herein. The reflective coating may be directly on the shape memory composite material or on a membrane overlaying the shape memory composite material. In an exemplary embodiment, the monolithic surface of shape memory composite material may replace the struts and/or outer frame of the support structure. Essentially, the monolithic shape memory composite material becomes a self-supporting structure.

In an exemplary embodiment, the reflector element is a packageable membrane coated with a layer of high conductivity metal. The membrane may be mylar, kapton, polyurethane-coated nylon (PCN), tedlar, teflon, or other polyimide or plastic material. The double curvature of the membrane is obtained via the joining of accurately-cut flat gores of the membrane joined by adhesive or material melting at the seams or with the use of direct casting or thermo-forming. The support structures are the toroidal ring, radial, ribs and struts. These are made of composite material consisting of one or a combination of carbon fabric or tows, Vectran, or Kevlar. The matrix of the composite may be silicone, urethane, or epoxy. The support structures are designed and fabricated such that they are collapsible for folding-packaging and stowing. They may also be fabricated using shape memory composites. The composite ribs are fabricated to have the curvature necessary to achieve high antenna gain and efficiency. As an example, for a parabolic surface reflector, all the ribs lie on the surface of the paraboloid. For packaging, the toroidal ring, ribs, and struts are folded, similar to a folding umbrella and the reflector membrane stowed between or over the ribs, struts, and toroidal ring. Deployment is effected by allowing the packaged antenna to deploy to its final antenna configuration by releasing the stored strain energy in its packaged (or stowed) configuration. By the very nature of the material of the support structures, their springiness is tailorable up and down the stiffness scale at the time of fabrication.

However, an exemplary embodiment of the reflector design includes gores of a low-coefficient of thermal expansion polyimide membrane coated with 1,500 angstroms of Silver-Inconel with the support structures made of a foldable shape memory carbon composite material. In order to achieve a structure that is tolerant of the coefficient of thermal expansion (CTE) difference between the RF reflecting element and the support structure(s), an extremely low-CTE membrane such as Novastrat™ may be used.

For applications where the solar radiation pressure impinging on the antenna surface needs to be reduced, the metallization on the membrane may be laid out as a conductive grid pattern of "vertical" and "horizontal" stripes of a pre-determined width and spacing. Given the desired RF transmissivity or RF reflectivity at a certain RF frequency, the width and spacing of the conductive stripes can be determined. The areas of the membrane without metallization allow a high percentage of solar radiation to be transmitted through, reducing the overall solar radiation pressure on the membrane. The stripes may have any pattern and are not limited to linear or orthogonal configurations. The stripes may be curved to match a perimeter, support structure, or other shape or contour of the antenna. The stripes may be equidistantly spaced or may have a variable space between successive adjacent stripes or a variable space along the same adjacent stripes. For example, a stripe may fan out similar to the support structure. The stripes may also be linear along their length.

In some cases, it may be preferable to have the support structures made of hollow tubes, instead of foldable rods. Their deployment may be initiated by the use of an onboard pump and an inflatant gas such as nitrogen, carbon dioxide, or other inert substances like helium or argon. Other gases may also be used, depending on the mission concept.

In an exemplary embodiment, the aperture of the reflector 20 may be covered by a membrane such as Kapton, Mylar, Tedlar, Kapton, polyurethane coated nylon fabric or similar in order to have an enclosed volume between the reflector 20 and the aperture surface. The aperture of the reflector 20 may be defined by an outer perimeter of the support structure or any combination of sub components that when a cover is positioned there over, a cavity or space is formed between the reflector and/or support structure and/or mesh with the cover material when the structure is deployed. This enables pressurization of the enclosed volume to enable and/or aid reflector deployment via inflation using inflatant gas such as nitrogen, carbon dioxide, or other inert substances like helium or argon. Other gases may also be used depending on the mission concept. Deployment to its final shape may be aided by the use of inflation. This is achieved by covering the aperture area of the antenna with a membrane such as Kapton, Mylar, Teflon, or Tedlar in order to have an enclosed volume that consists of the antenna surface and the membrane cover. This enclosed volume is then inflated using nitrogen, carbon dioxide or other inert gas like helium or argon. After pressurization to its final deployed shape, the inflatant may be allowed to vent out non-propulsively or otherwise or left in place.

In an exemplary embodiment, when the non-inflated membrane antenna is fully deployed, the deployed structure is stiff by virtue not only of the material it is made of but also of its geometry. Inflatants may also be used to add to the rigidity of the structure, according to embodiments described herein.

In an exemplary embodiment, the shape memory material may be used for all or only portions of the support structure. For example, the reflector outer frame may comprise shape memory material, while the ribs comprise conventional rigid segmented materials. Other combinations of shape memory structures with conventional structures are also contemplated hereby. Therefore, any combination of shape memory composite materials, inflatable materials, rigidizable materials, or rigid materials across any combination of components are contemplated hereby.

Figure 6A:
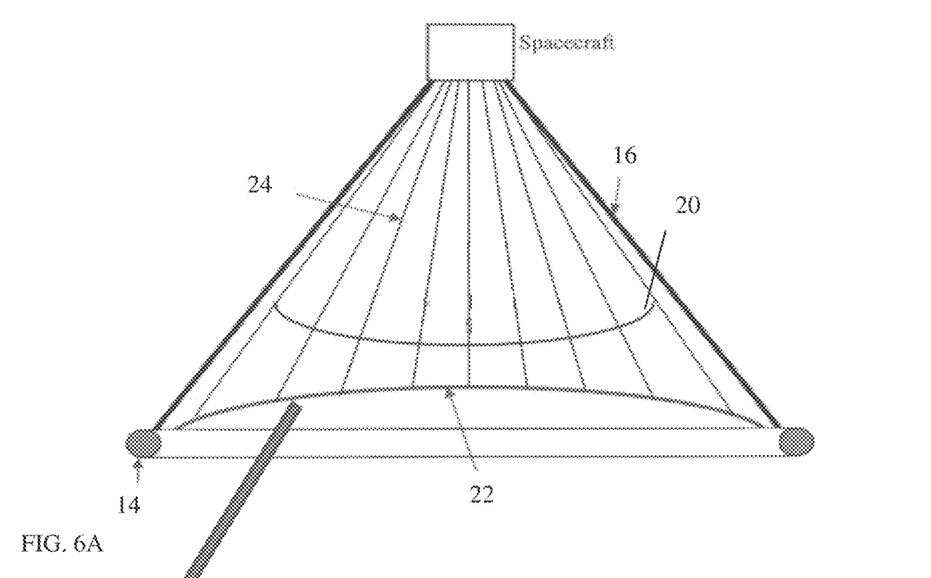
FIG. 6A illustrates an exemplary deployable antenna configuration.

FIG. 6A illustrates an exemplary compactable deployable antenna configuration. As shown a support structure may be created by an outer frame 14 and a plurality of struts 16. The struts extend from the outer frame to the spacecraft or collector (referred to generally as the hub). The outer frame 14 and plurality of struts 16 define the support structure for the reflector 20. The support structure may comprise the shape memory composite as described above or other known material, such as an inflatable, rigidizable, or static foldable structure. As shown, the support structure includes a toroidal outer frame and three struts. However, any number of struts, preferably two to six may be used. The support structure defines an outer envelope or surface for which the reflective surface is fully contained. The support structure is the deployable structure to define the shape of the deployed antenna.

Figure 6B:
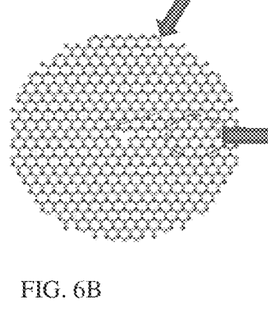
FIGS. 6B-6D illustrate exploded component parts from FIG. 6A.
Figure 6C:
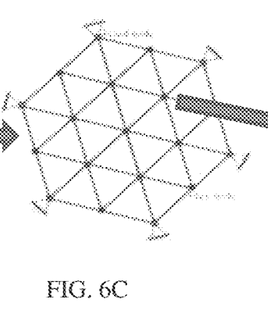
Figure 6D:
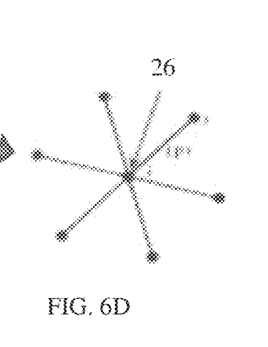
Figure 7:
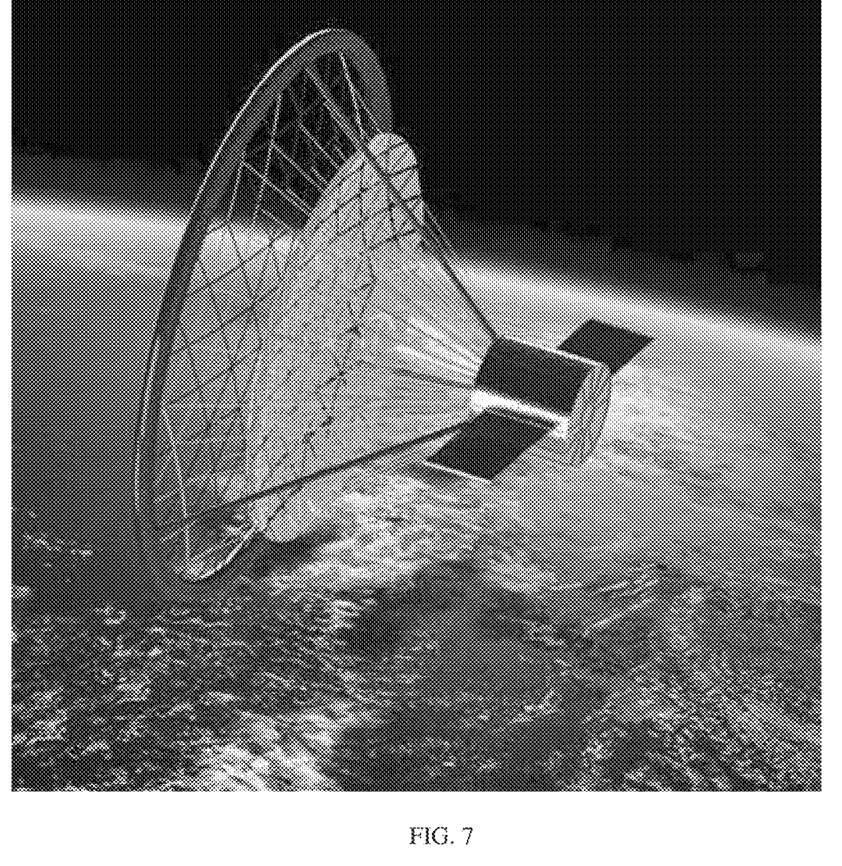
FIG. 7 illustrates an exemplary deployable antenna in a deployed configuration.

The compactable deployable antenna includes a net-mesh 22 enclosed and supported by the outer frame 14. FIG. 6B illustrates an elevated view of the net-mesh, with FIGS. 6C and 6D illustrating blown up views of notes of the net-mesh. The net-mesh may be any flexible material that provides a plurality of nodes 26 for attachment points as described herein. When the outer frame is deployed, the net-mesh is expanded. A plurality of nodes of the net-mesh are coupled to tension elements 24 that extend from the net-mesh to the hub. When the support structure is deployed, the tension elements are under tension and define the surface shape of the net-mesh. The net-mesh may define an out of plane, generally curved structure, from the outer frame, when in a deployed condition. The tension elements may retain the net-mesh toward the hub.

The tension elements may provide supporting structures for reflective membranes. A reflector 20 may therefore be defined within the volume defined by the net-mesh, outer frame, and struts. The reflector 20 may comprise a plurality of panels coupled to the tension elements. The position of the panels may define the reflector shape. The reflector surface may approximate a curved surface by step-wise placement of generally planar panels. The reflector 20 may comprise panels of mylar, kapton, polyurethane coated nylon (PCN) or tedlar coated with a layer of 100 to 1500 Angstroms thick high-conductivity metal such as aluminum, silver, or silver-inconel. Other reflective surfaces as described herein or known by a person of skill in the art may also be used.

In an exemplary embodiment, the reflector 20 and the net mesh 22 may be interchanged such that the reflector is now in position 22 and the net mesh in position 20. After the repositioning of 20 and 22, the original curved shapes are retained and not inverted. In this new configuration, the reflector 20 that is now in position 22 maintains the original curvature of 22 and the net mesh that is now in position 20 retains the original curvature of 20.

In an exemplary embodiment, a highly compactable deployable antenna includes a net-mesh with a perimeter toroidal ring support, three or more struts, a plurality of strings (tension ties), a conductive parabolic membrane surface, and combinations thereof (or combinations from other embodiments described herein). Lightweight high stiffness tension elements, strings, are attached to each of the nodes of the net-mesh structure. The other end of each of the strings is attached at its opposite end to the hub. When the strings are tensioned by deployment of the support structure, the net mesh deforms to the desired curved surface as illustrated to define, for example, an inverted net-mesh dome. The curved shape may be any surface of revolution including but not limited to a paraboloid, sphere or a hyperboloid. Exemplary embodiments describing curved surfaces include their approximation by piece-wise planar or linear segments.

Low-stowed volume antennas with aperture diameters on the order of tens of meters, up to 100 m diameter can be fabricated using this design.

FIG. 6B illustrates the plan view of the net-mesh invert dome. The reflector surface may consist of triangular conductive facets of mylar, kapton, polyurethane coated nylon (PCN) or tedlar coated with a layer of 100 to 1500 Angstroms thick high-conductivity metal such as aluminum, silver, or silver-inconel. The triangular metallized facets look very similar to that shown in FIG. 6C. Each of the vertices of the metalized triangular facet may be attached to the tensioned string at the appropriate locations to form a desired surface of revolution; e.g. a paraboloid. Because the conductive membrane facets do not have to be stretched to a high film stress, the loads on the support structures (toroidal ring and struts) may be small. This translates to lower mass for the overall system.

The reflector may also be made of accurately-cut flat gores of the metallized membrane joined by adhesive or material melting at the seams or with the use of direct casting or thermo-forming.

The support structure may include the toroidal ring and struts. The support structure may be made of composite material consisting of one or a combination of carbon fabric or toes, Vectran, or Kevlar. The matrix of the composite may be silicone, urethane, or epoxy. The support structures are designed and fabricated such that they are collapsible for folding-packaging and stowing. They may also be fabricated using shape memory composites. The net mesh of the reflector dome is fabricated to have the curvature necessary to achieve high antenna gain and efficiency. For packaging, the toroidal ring and struts are folded, similar and the reflector membrane stowed between or over the struts, and toroidal ring. Deployment may be effected by the use of either (a) a set of telescoping struts or (b) a set of struts and a toroidal ring, made from shape memory composite material, allowing the packaged antenna to deploy to its final antenna configuration by releasing the stored strain energy in its packaged (or stowed) configuration. By the very nature of the material of the support structures, their springiness may be tailorable up and down the stiffness scale at the time of fabrication.

In an exemplary embodiment, the support structures or portions of the support structures are made of hollow tubes. Deployment of the tubular support structures may be effected by the use of inflatant gas such as nitrogen, carbon dioxide, or other inert substance like helium or argon. Other gases may also be used.

Figure 8A:
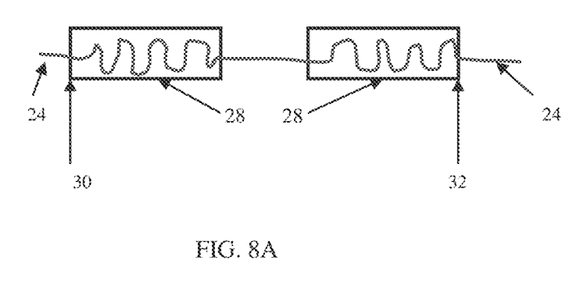
FIGS. 8A-8B illustrate an exemplary stowage component view of FIG. 6A.
Figure 8B:
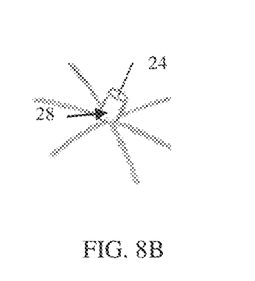

To prevent tangling of the tension elements, each string may be packaged within two enclosures 28, one at the net-mesh end 30, and the other attached at the opposite end 32, proximate the hub, as shown in FIGS. 8A-8B. As the struts are deployed, the strings are pulled out of their enclosure. The enclosure may be any circumferential enclosure, such as a tube. The enclosure may be flexible and deformable, such that it does not have to retain a given shape, but simply separates one string from another.

Figure 9:
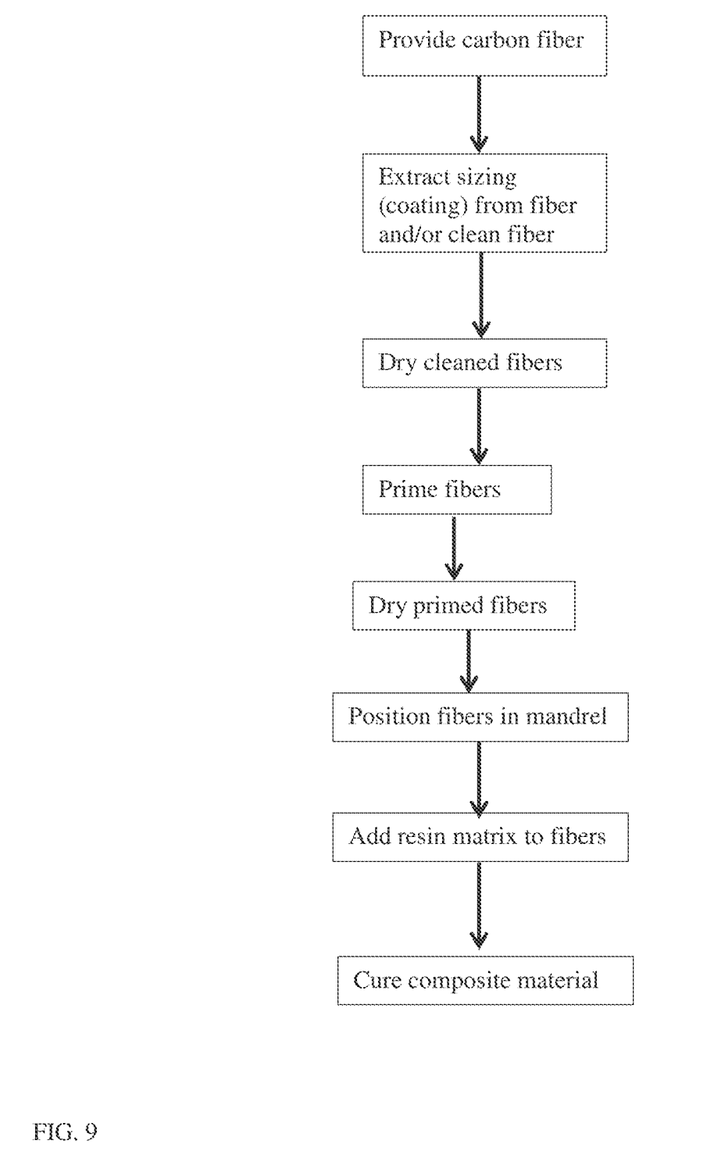
FIG. 9 illustrates an exemplary flow diagram for a method of making a composite material according to embodiments described herein.

FIG. 9 illustrates a flow diagram for an exemplary method of creating the memory composite material for the support structure according to embodiments described herein. Exemplary embodiments may include positioning fibers within a mandrel and applying resin therein. In order to improve wetting of the fibers, the fiber strands may first be cleaned using acetone, IPA, and/or other cleaning agent. In order to improve impregnation of the fibers with the resin, a primer element may be applied to the fibers before the resin. The cleaning process may be aided by subjecting the fibers to temperature above ambient for a few minutes to a few hours.

To improve the long term shape memory attributes of the composite material, additional steps may be applied to the fiber before combining or applying the resin matrix. In an exemplary embodiment, the fiber is cleaned using solvent to remove the poisoning molecules (sizing). In an exemplary embodiment, a primer treatment is applied to the fibers in order to (a) neutralize any remaining poisoning molecules and (b) introduce additional molecules that bond (link) reactive groups between the resin and fiber. In an exemplary embodiment, either or both steps may be taken sequentially as necessary. Each step may lead to enhanced bonding and better shape memory properties. After incorporating both steps into the fabrication process, exemplary embodiments of the composite material showed retention of the shape memory property sustained for up to 2 years.

In an exemplary embodiment of fabricating the composite material according to embodiments described herein, the fibers are first submerged in a container with large volume of cleaning solution (i.e. acetone) to extract the sizing (coating) on the fiber surface. The solution may be agitated to aid in the penetration of the cleaning solution into the fiber bundle. After, the fibers are removed and placed in a second container with a large volume of cleaning solution and agitated to further exact any remaining sizing that was not eliminated in the first submersion. Then the fibers are removed from the cleaning solution and placed on a working table to allow the solution to dry (approximately 30 minutes in ambient conditions).

In an exemplary embodiment of fabricating the composite material according to embodiments described herein, the fibers are submerged in a container with a primer solution that may be agitated to aid in the penetration of the primer molecules into the fiber bundle. Then the fibers are removed from the primer solution and placed on a working table to allow the solvent in the primer solution to evaporate (approximately 30 minutes in ambient conditions), thus leaving only the primer molecules on the surface of each fiber.

Exemplary embodiments describe positioning of the fibers in the container and/or on a table to dry. However, any configuration of applying the cleaning solution and/or primer solution and/or drying the fibers can be used. For example, the fibers may be hung. For example, the solutions may be applied by submersion, sprayed, brushed, rolled, etc.

Below is an exemplary detailed procedure to fabricate the shape memory carbon composite (SMCC) material.

First, the chemicals and components are provided, including carbon fiber (unidirectional tows), elastomeric resin, primer solution, acetone (cleaning solvent), and shaping mandrel.

Next, the carbon fiber tows are cut to the appropriate length. The carbon fibers tows are may be provided with an excess of approximately 2 inches on each end beyond the desired length of the final component. The carbon fiber tows are secured at one end and placed in the cleaning solvent to remove sizing and contaminants. The fibers may be firmly held on both ends and dipped into and lifted out of the solution with a tool. The ends of the fiber tows may be secured, tied, or otherwise attached to prevent the fiber tows from unraveling once the sizing is removed. The carbon fiber is removed from the cleaning solution and excess solvent is removed. The carbon fiber bundles are permitted to dry, such as in ambient conditions for approximately 30 minutes. If the carbon fibers appear wet after the drying period or to otherwise assist in the drying process, a heat gun or other outside heat source may be used to increase the temperature of the drying environment. The primer solution may then be applied to the cleaned fiber bundle. The fibers may be held firmly on one or both ends and dipped into and lifted out of a primer solution. Care should be taken to not damage the fibers during application of the primer solution and that the primer solution has penetrated through the fibers. The primed fiber bundle is then permitted to dry, such as in ambient conditions for one hour. The elastomeric resin is then prepared according to the manufacturer's specifications. The elastomeric resin is then applied to the carbon fiber bundles. The resin may be brushed or applied to the fibers. A block of Teflon may be used for the applicator to the fibers. The resin impregnated fibers may then be positioned within channels of the mandrel. Pressure may be applied (such as with the applicator of the resin to the fiber) onto the fibers so that the fibers are positioned in contact with the bottom of the channel of the mandrel and conform to the channel shaped. Impregnated fibers are added until all channels of the mandrel are filled with impregnated fiber. The impregnated fibers may be cut to the appropriate length corresponding to the channel of the mandrel. The excess resin may be removed from the mandrel by wiping the exterior surfaces outside of the channels. The impregnated carbon fibers are permitted to cure in the mandrel. The curing may be in ambient conditions for 8 to 16 hours. The mandrel may then be positioned in an oven or other heat source to cure the resin to full cure. After the composite material is fully cured, the structure may be removed from the mandrel.

The resulting composite material from the mandrel may be used as the support as described herein. An exemplary support from the method described herein may include a composite material of carbon fibers and elastomeric resin having a fiber to resin volume fraction ratio of between 52 to 65.

After the support is created, the method of making an antenna as described herein may also include coupling the collector to the support. Creating and coupling the collector may include attaching a net-mesh to the support, such as at the toroidal outer frame of the support. The net-mesh may define a plurality of nodes. Then, a plurality of tension elements may be attached to the plurality of nodes, the tension elements in tension and define a deployed shape of the net-mesh in a deployed configuration. A membrane may then be attached to the tension elements.

In an exemplary embodiment, the collector may be created from a plurality of membranes. Therefore, each membrane of the plurality of membranes may be coupled to and between adjacent tension elements. The membrane may also include a metallization positioned thereon that defines a pattern, such as a plurality of stripes. Other patterns, such as grids may also be used.

Figure 10A:
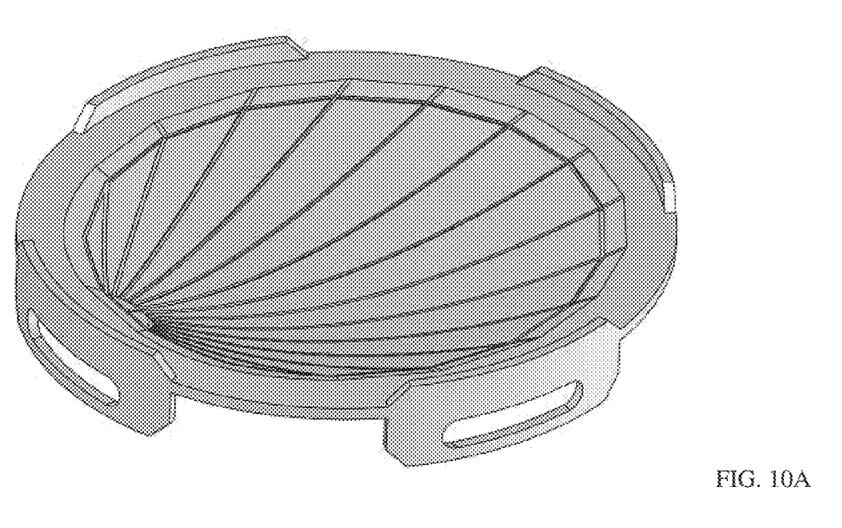
FIGS. 10A-10B illustrate an exemplary mandrel according to embodiments described herein.
Figure 10B:
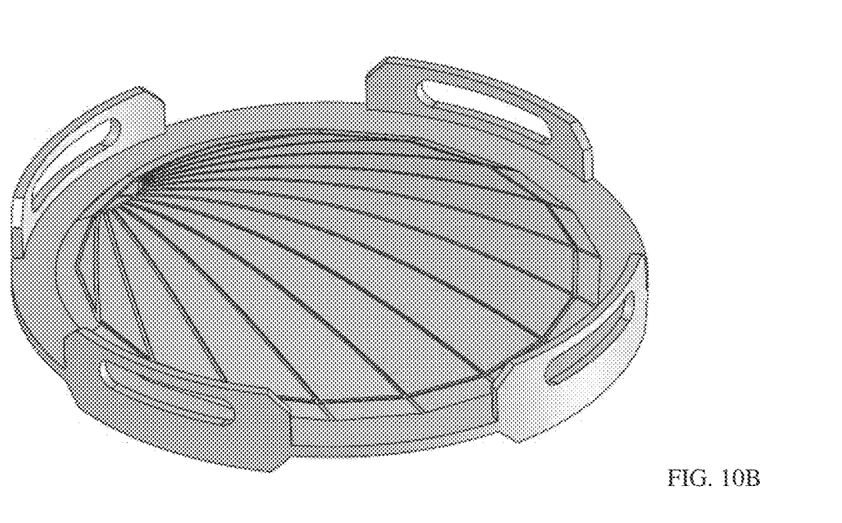

FIGS. 10A-10B illustrate an exemplary mandrel according to embodiments described herein. In an exemplary embodiment, the concave side may be used as a mold to lay the carbon fiber composite frame such as the ribs and the inner and outer rings. Exemplary embodiments may include a coating to act as a mold release. In an exemplary embodiment, the convex side may be used for membrane alignment. The mandrel may be faceted per the final membrane shape. The mandrel may be made of an aluminum alloy such as 6061-T6 aluminum alloy. The mandrel may include a plurality of channels that define a shape for the support as described herein. For example, the mandrel may include a toroidal outer channel and at least three strut channels coupled to the toroidal outer channel. The strut channels may extend out of plane of the toroidal channel and the strut channels may generally converge toward each other.

Figure 11:
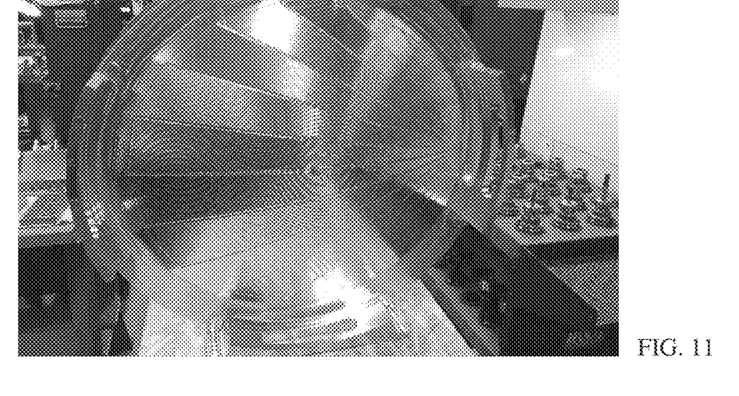
FIGS. 11 and 12 illustrate exemplary mandrels according to embodiments described herein
Figure 12:
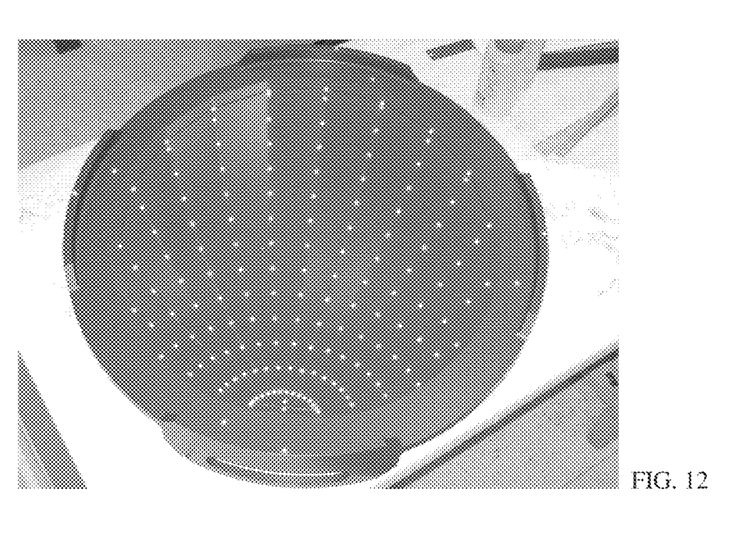
Figure 13:
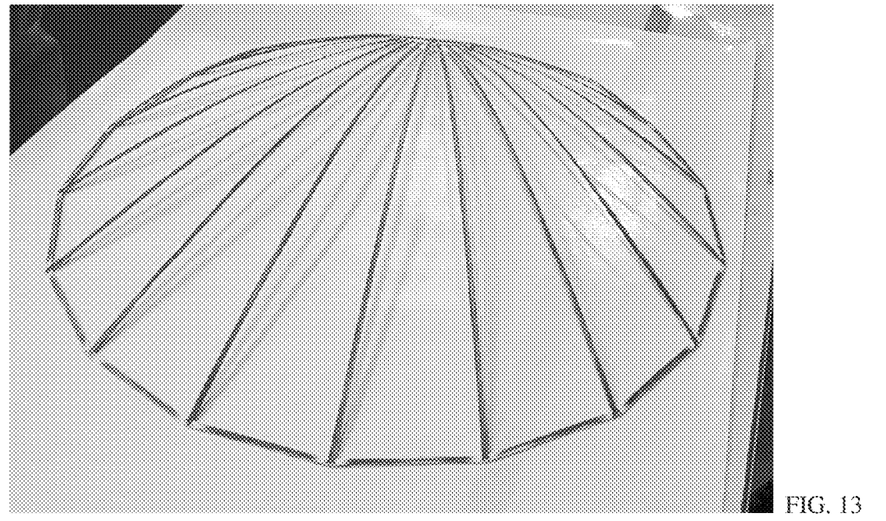
FIG. 13 illustrates an exemplary composite material structure after curing and removal from the mandrel.
Figure 14:
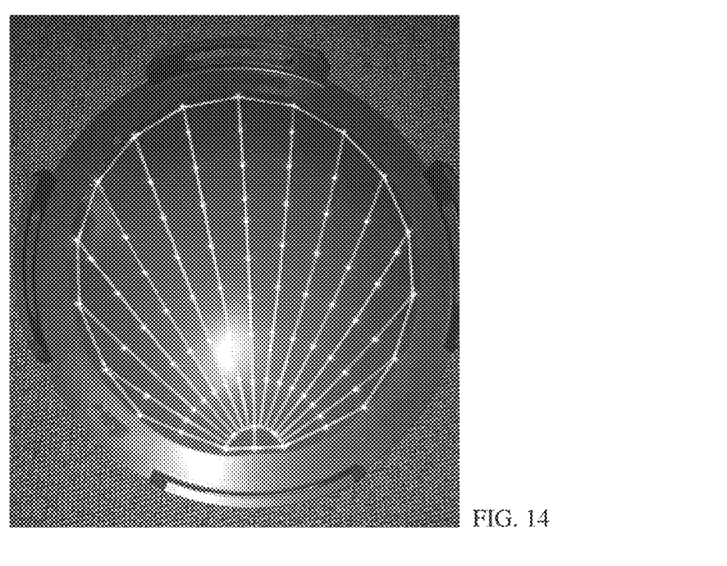
FIG. 14 illustrates an exemplary composite material positioned within the mandrel with retro-reflective targets for photogrammetry.

FIG. 11 illustrates an exemplary mandrel that is uncoated. FIG. 12 illustrates an exemplary mold coated with mold release and including retro-reflective targets for photogrammetry. FIG. 13 illustrates an exemplary composite material structure after curing and removal from the mandrel. FIG. 14 illustrates an exemplary composite material positioned within the mandrel with retro-reflective targets for photogrammetry.

In order to achieve identical or similar structural, electromagnetic packaging, folding and memory retention performance when larger antennas are fabricated, the optimum parameters such as thickness, width, fiber-to-resin volume fraction, carbon fiber type, and surface geometry tessellation are determined and selected accordingly.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, the terms "approximately", "about", and "substantially" may refer to an amount that is within less than 10% of, within less than 5% of, within less than 1% of, within less than 0.1% of, and within less than 0.01% of the stated amount or characteristic. Numbers preceded by a term such as "about" or "approximately" also include the recited numbers. For example, "about 3.5 mm" includes "3.5 mm". For example, the disclosure expressly contemplates being able a value or range proceeded by a term such as "about" or "approximately" in this disclosure with or without such term.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. As another illustration, a numerical range of "about 1 to about 5" would also include the embodiment of a range of "1 to 5." This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A method of making a deployable antenna having a support and a collector, comprising:
    providing a carbon fiber tow having a plurality of carbon fibers retained in a sizing,
    cutting the carbon fiber tow to a length;
    applying a resin to the plurality of carbon fibers to create a resin carbon fiber tow;
    providing a mandrel having channels in a shape of the support;
    positioning the resin carbon fiber tow within a channel of the mandrel; wherein the length of the carbon fiber tow is four inches beyond a length of the channel of the mandrel,
    repeat the steps of providing a plurality of carbon fiber tows, cutting the carbon fiber tows, applying the resin to the plurality of carbon fiber tows, and positioning the resin carbon fiber tows within respective channels of the mandrel until all selected channels of the mandrel are filled with resin carbon fiber tows;
    curing the resin carbon fiber tows within the selected channels of the mandrel to create the support;
    removing the support from the mandrel; and
    coupling a membrane to the support to create the collector.

2. The method of claim 1, wherein a variation of the length of the carbon fiber tow is within 10% of the length.

3. The method of claim 1, further comprising securing the carbon fiber tow on at least one end.

4. The method of claim 3, further comprising removing the sizing with a solvent to create a cleaned plurality of carbon fibers.

5. The method of claim 4, further comprising permitting the carbon fibers to dry after the sizing is removed.

6. The method of claim 5, further comprising applying a primer solution to the cleaned plurality of carbon fibers to create primed carbon fibers.

7. The method of claim 6, further comprising permitting the primer solution to dry prior to applying the resin.

8. The method of claim 7, wherein the resin is an elastomeric resin.

9. The method of claim 8, wherein the resin is applied using a block of Teflon as an applicator and the resin is brushed onto the plurality of carbon fibers.

10. The method of claim 9, further comprising applying pressure to the resin carbon fiber tows within the channel of the mandrel to conform the resin carbon fiber tows to the channel and to contact a bottom of the channel of the mandrel.

11. The method of claim 10, further comprising cutting the carbon fibers to a length equal to the length of the channel of the mandrel to which the resin carbon fiber tows are positioned.

12. The method of claim 11, further comprising removing excess of resin from the mandrel.

13. The method of claim 12, wherein the support comprises a composite material of carbon fiber and elastomeric resin having a fiber to resin volume fraction ratio of between 52 to 65.

14. The method of claim 13, wherein the mandrel comprises a toroidal outer channel and at least three strut channels coupled to the toroidal outer channel.

15. The method of claim 14, further comprising attaching a net-mesh to a toroidal outer frame of the support, the net mesh defining a plurality of nodes.

16. The method of claim 15, further comprising attaching a plurality of tension elements to the plurality of nodes, the tension elements in tension and define a deployed shape of the net-mesh in a deployed configuration.

17. The method of claim 16, wherein coupling the membrane to the support is by attaching the membrane to the tension elements.

18. The method of claim 17, wherein the collector comprises a plurality of membranes, each reflector membrane is coupled to the adjacent tension element.

19. The method of claim 1, wherein the mandrel comprises channels in a shape of a toroid and struts extend out of plane of the toroid and converge toward each other.

20. The method of claim 1, wherein the membrane has a metallization positioned thereon to define a plurality of reflective stripes.

* * * * *